United States Patent [19]

Isgen

[11] Patent Number: 5,177,990
[45] Date of Patent: Jan. 12, 1993

[54] AUTOFRETTAGE DEVICE FOR TUBES

[75] Inventor: Helmut Isgen, Willich, Fed. Rep. of Germany

[73] Assignee: Rheinmetall GmbH, Düsseldorf, Fed. Rep. of Germany

[21] Appl. No.: 836,830

[22] Filed: Feb. 19, 1992

[30] Foreign Application Priority Data

May 10, 1991 [DE] Fed. Rep. of Germany ....... 4115284

[51] Int. Cl.⁵ .............................................. B21D 26/02
[52] U.S. Cl. ........................................... 72/54; 72/61; 29/1.11
[58] Field of Search ................... 72/54, 56, 60, 61, 62; 29/421.1, 1.11, 446

[56] References Cited

U.S. PATENT DOCUMENTS

| 1,540,654 | 6/1925 | Schneider | 29/1.11 |
| 1,578,751 | 3/1926 | Methlin | 29/1.11 |
| 1,602,282 | 10/1926 | Methlin | 29/1.11 |
| 3,751,954 | 8/1973 | Ezra et al. | 29/1.11 |
| 4,571,969 | 2/1986 | Tomita | 72/56 |

FOREIGN PATENT DOCUMENTS 602690 12/1924 France .

Primary Examiner—David Jones
Attorney, Agent, or Firm—Spencer, Frank & Schneider

[57] ABSTRACT

An autofrettage device for a tube includes thrust bearings for receiving opposite ends of the tube. A mandrel is introducible into the tube and includes a sealing arrangement for sealing an annular gap between the mandrel and an inner wall of the tube against escape of a pressure medium supplied to the annular gap. A mandrel holder including a ball joint socket supports the end of said mandrel so that the mandrel is pivotally movable relative to the mandrel holder.

10 Claims, 1 Drawing Sheet

AUTOFRETTAGE DEVICE FOR TUBES

BACKGROUND OF THE INVENTION

The present invention relates to an autofrettage device for a tube, particularly for a gun tube, in which the autofrettage device includes two thrust bearings receiving opposite ends of the tube, a mandrel for introduction into the tube and including a sealing arrangement for sealing an annular gap between the inner wall of the tube and the mandrel against a pressure medium supplied to the annular gap, and with the mandrel being received by a mandrel holder.

French Pat. No. 602,690 discloses a mandrel that is introduced into a tube, such as a gun tube blank, for the autofrettage of the tube in sections. The end regions of the mandrel are provided with sealing devices to seal an annular chamber formed between the mandrel and the interior wall of the tube and charged with a pressure medium. The mandrel is received by a mandrel holder which has a cylindrical shape and serves to charge the end face of the mandrel with pressure medium. The mandrel holder and the tube are here disposed in a holder. To perform an autofrettage, pressures up to about 14,000 bar are employed. Consequently and because of the rigid arrangement of the mandrel, the mandrel is subjected to considerable stresses from transverse forces and has a short service life. It is also subject to high manufacturing risks.

SUMMARY OF THE INVENTION

It is an object of the present invention to provide an autofrettage device of the type first described above which reduces the stress on the mandrel and thus increases its service life and reduces manufacturing risks.

The above and other objects are accomplished in accordance with the invention by the provision of an autofrettage device for a tube, comprising: thrust bearings means for receiving opposite ends of the tube; a mandrel for introduction into the tube and including sealing means for sealing an annular gap between the mandrel and an inner wall of the tube against escape of a pressure medium supplied to the annular gap, the mandrel having an end; and a mandrel holder including a ball joint socket for supporting the end of the mandrel so that the mandrel is pivotally movable relative to the mandrel holder.

As a result of the invention, the mandrel is received floatingly by the tube. Because of the axial ball socket mounting of the mandrel, the mandrel is subjected to practically no transverse forces so that its service life is substantially lengthened and the manufacturing risk is reduced accordingly.

BRIEF DESCRIPTION OF THE DRAWINGS

The present invention will now be described in greater detail with reference the drawings in which.

DETAILED DESCRIPTION OF PREFERRED EMBODIMENTS

Figure 1:
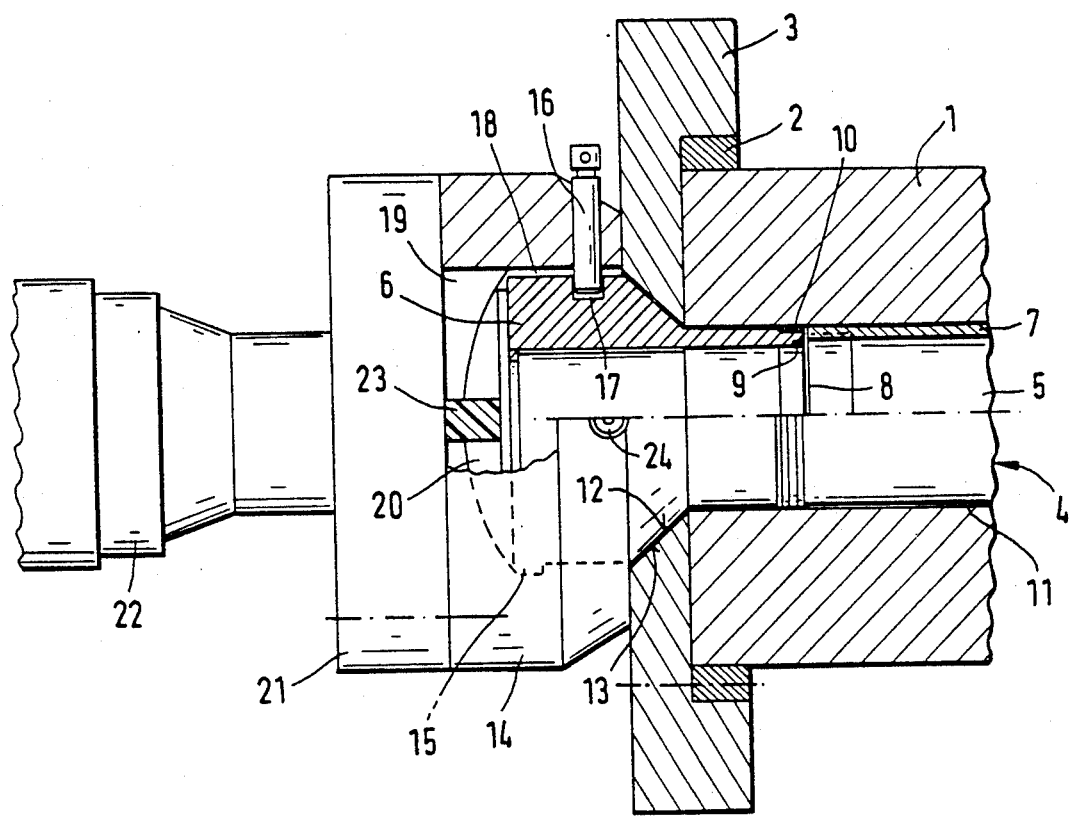
FIG. 1 is a partial sectional view of an autofrettage device in accordance with the invention.

Referring to FIG. 1, a thick-walled tube 1 to be treated, for example a gun tube to whose ends a centering ring 2 is attached, is received at both ends in thrust bearings 3, only one of which is shown for ease of illustration. Centering ring 2 is screwed to an adjacent thrust bearing 3.

In order to treat tube 1, a mandrel 4 is introduced into tube 1. Mandrel 4 includes an elongated mandrel core 5 whose one end is provided with a pressure medium connection head 6 that is screwed to mandrel core 5. Additionally, a fill tube 7 is screwed to mandrel core 5, with a circumferential annular gap 8 being disposed between the adjacent end faces of pressure medium connection head 6 and fill tube 7. The annular gap is connected with a pressure medium supply channel (not shown) in pressure medium connection head 6. An inner seal 9 is disposed between pressure medium connection head 6 and mandrel core 5 and an outer seal 10 is arranged between pressure medium connection head 6 and tube 1 to prevent the escape of pressure medium to the outside and produce an influx of pressure medium into an annular gap 11 between the interior of tube 1 and fill tube 7. Annular gap 11 extends over the region of tube 1 to be treated and is sealed against the other tube end (not shown) adjacent to the free end of mandrel 4 by a further sealing arrangement (not shown).

Pressure medium connection head 6 includes a frustoconical portion 12 which corresponds to a mating guide cone 13 in thrust bearing 3, with guide cone 13 being arranged so as to be concentric with the axis of tube 1.

Pressure medium connection head 6 of mandrel 4 is releasably accommodated in a mandrel holder 14, with bayonet combs 15 being provided at pressure medium connecting head 6 so that mandrel 4, once inserted and turned by, for example, 45°, is held in mandrel holder 14. In addition, a locking pin 16 is provided at mandrel holder 14 and drops into a recess 17 in pressure medium connection head 6 so as to secure mandrel 4 against rotation relative to mandrel holder 14.

An axial recess 18 of mandrel holder 14 accommodates not only mandrel 4, that is, its pressure medium connection head 6, with play but also a ball socket 19 and a ball segment 20 that is part of a ball joint. Ball socket 19 is here supported at its planar rear face by a flange 21 of a cylinder 22 that is screwed to mandrel holder 14 and is employed to insert mandrel 4 into tube 1, while the planar forward end face of ball segment 20 is supported o the end face of mandrel 4 (i.e. the end face of pressure medium connection head 6). The two components 19 and 20 of the ball joint are held loosely by mandrel holder 14 and are provided with a central recess to accommodate a rubber plug 23 which holds the two components 19 and 20 together so that they can be elastically rotated relative to one another. Since the possible pivot angle of mandrel 4 relative to mandrel holder 14 is small, there is not much stress on rubber plug 23.

The pressure medium supply to annular gap 11 is provided through a pressure medium connection conduit 24 and through mandrel holder 14 to pressure medium connection head 6 and, through its pressure medium supply channel (not shown), to annular gap 8.

The ball joint composed of components 19 and 20 causes mandrel 4 to be floatingly mounted in tube 1 and prevents transverse forces which could adversely affect the floating mount of mandrel 4 from acting o mandrel 4 because of the axial ball socket support.

Moreover, the autofrettage device of the invention can be assembled ready for operation relatively quickly since mandrel 4 is simply pushed into mandrel holder 14, turned and secured by means of locking pin 16, and then it is hydraulically introduced into tube 1 by means of cylinder 22, with guide cone 13 of thrust bearing 3 ensuring proper threading (insertion) of mandrel 4 in tube 1. An exchange of mandrel 4 for another mandrel having a different inner tube diameter is easily possible.

The floating mount of mandrel 4 and the stress relief connected therewith results in a substantially lengthened service life for the mandrel, a lower manufacturing risk and better quenching and tempering values for mandrel core 5.

Mandrel holder 14 ensures seating of mandrel 4 in an essentially axial orientation when inserted into and pulled out of tube 1 without it being necessary to support mandrel 4 anywhere to prevent it from pivoting downward.

Obviously, numerous and additional modifications and variations of the present invention are possible in light of the above teachings. It is therefore to be understood that within the scope of the appended claims, the invention may be practiced otherwise than an specifically claimed.

What is claimed is:

1. An autofrettage device for a tube, comprising:
   thrust bearing means for receiving opposite ends of the tube;
   a mandrel for introduction into the tube and including sealing means for sealing an annular gap between said mandrel and an inner wall of the tube against escape of a pressure medium supplied to said annular gap, said mandrel having an end; and
   a mandrel holder including a ball joint socket for supporting the end of said mandrel so that said mandrel is pivotally movable relative to said mandrel holder.

2. An autofrettage device as defined in claim 1, further comprising a ball segment having an end face supported at the end of said mandrel, wherein said ball joint socket receives said ball segment.

3. An autofrettage device as defined in claim 2, wherein said ball joint socket and said ball segment are held loosely by said mandrel holder.

4. An autofrettage device as defined in claim 3, further comprising a rubber plug for connecting said ball joint socket and said ball segment with one another.

5. An autofrettage device as defined in claim 1, wherein said thrust bearing means includes a thrust bearing disposed adjacent to said mandrel holder that includes a guide cone for guiding insertion of said mandrel into the tube.

6. An autofrettage device as defined in claim 5, wherein said mandrel includes a frustoconical portion which can be brought into engagement with said guide cone.

7. An autofrettage device as defined in claim 1, further comprising a bayonet connection between said mandrel holder and said mandrel.

8. An autofrettage device as defined in claim 1, wherein said mandrel comprises a mandrel core and a pressure medium connection head screwed to said mandrel core, said pressure medium connection head having a end held by said mandrel holder, said device further comprising lock means for locking said pressure medium connection head relative to said mandrel holder.

9. An autofrettage device as defined in claim 8, wherein the pressure medium connection head includes bayonet projections for engagement with said mandrel holder.

10. An autofrettage device as defined in claim 8, wherein said thrust bearing includes a guide cone and said pressure medium connection head includes a frustoconical portion that can be brought into engagement with said guide cone.

* * * * *